United States Patent
Yanagishita

[11] Patent Number: 5,190,707
[45] Date of Patent: Mar. 2, 1993

[54] METHOD OF MOLDING SKIN-COVERED FOAMED ARTICLE

[75] Inventor: Norio Yanagishita, Kanagawa, Japan
[73] Assignee: Ikeda Bussan Co., Ltd., Ayase, Japan
[21] Appl. No.: 783,774
[22] Filed: Oct. 29, 1991
[30] Foreign Application Priority Data
Oct. 30, 1990 [JP] Japan ................ 2-293191
[51] Int. Cl.[5] ............................................ B29C 67/22
[52] U.S. Cl. .................. 264/46.6; 264/46.7; 264/278
[58] Field of Search .......... 264/46.4, 46.6, 45.1, 264/46.7, 278, 275

[56] References Cited

U.S. PATENT DOCUMENTS

| | | | |
|---|---|---|---|
| 3,123,403 | 3/1964 | Hood | 264/46.7 |
| 4,323,406 | 4/1982 | Morello | 264/46.7 |
| 4,738,809 | 4/1989 | Storch | 264/46.6 |
| 4,824,069 | 4/1989 | Shoji et al. | 264/278 |
| 4,860,415 | 8/1989 | Witzke | 264/46.4 |
| 4,956,136 | 9/1990 | Mizuno et al. | 264/46.6 |

FOREIGN PATENT DOCUMENTS

| | | | |
|---|---|---|---|
| 47-042946 | 10/1972 | Japan | 264/46.7 |
| 54-003189 | 2/1979 | Japan | 264/46.6 |
| 60-024906 | 2/1985 | Japan | 264/46.7 |
| 61-125836 | 6/1986 | Japan | 264/46.6 |
| 62-027992 | 2/1987 | Japan | 264/46.6 |
| 62-035811 | 2/1987 | Japan | 264/46.7 |
| 63-55954 | 11/1988 | Japan | . |

Primary Examiner—Allan R. Kuhns
Attorney, Agent, or Firm—Foley & Lardner

[57] ABSTRACT

A method of molding a skin-covered foamed article includes the steps of (a) putting an outer skin member having an opening to a mold; (b) putting a frame in the outer skin member; (c) setting a pair of wires at the end portion of the outer skin member so that the opening is tightly closed; (d) pouring a liquid foamable material in the outer skin member upon opening the opening; (e) closing the opening and the mold and curing the liquid foamable material; and (f) removing the wires from the outer skin member.

8 Claims, 2 Drawing Sheets

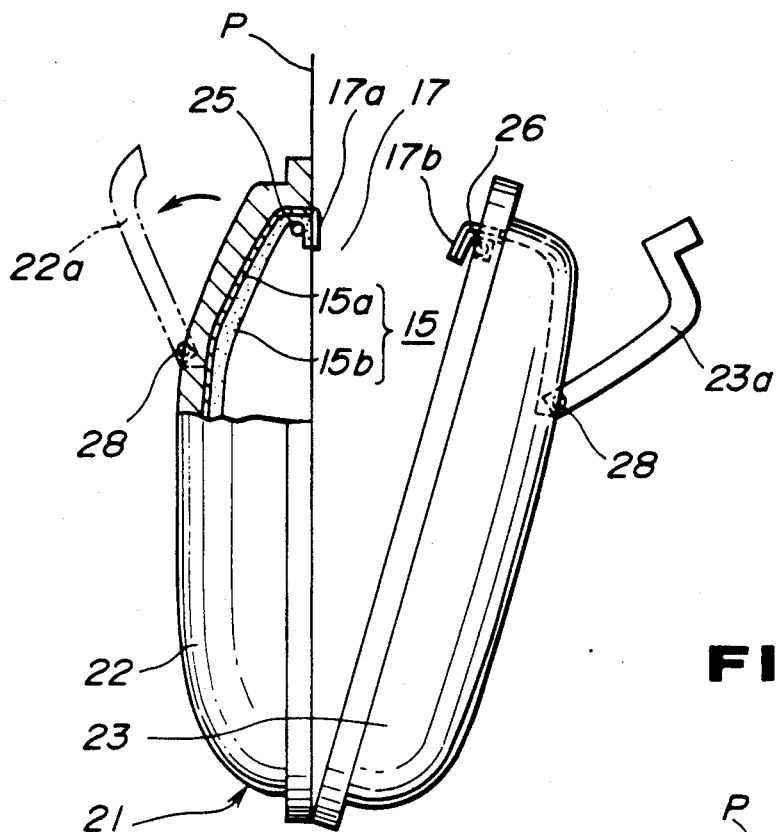
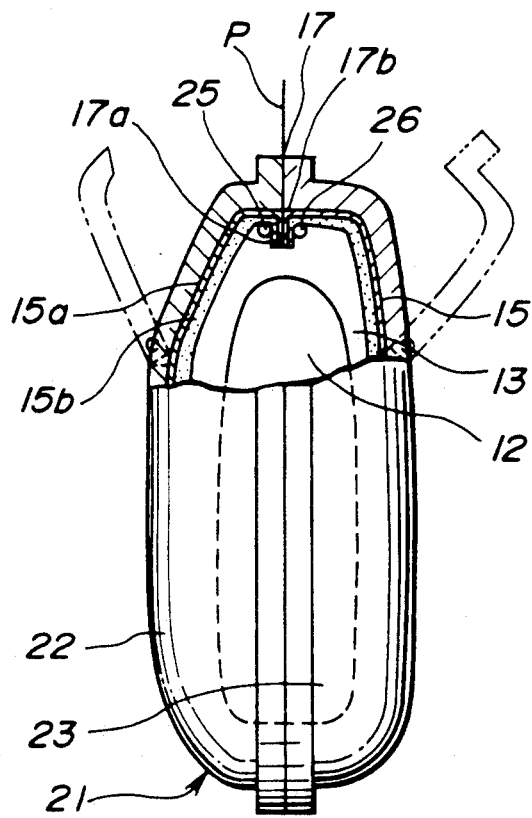

METHOD OF MOLDING SKIN-COVERED FOAMED ARTICLE

BACKGROUND OF THE INVENTION

1. Field of the Invention

The present invention relates to a method of molding a skin-covered article, and more particularly to a method of molding a skin-covered foamed article which may be used as an armrest for a vehicular seat.

2. Description of the Prior Art

Hitherto, various resilient seat parts, which are integrally molded into skin-covered foamed parts by foaming molding, have been proposed and put into practical use. Such a skin-covered foamed part has conventionally had drawbacks such that a an outer skin member of the skin-covered foamed part is spotted with or leaks a liquid foamable material therethrough and that the shape of a pad member is degraded, in the molding process in that the liquid foamable material is poured into the outer skin member through the opening defined by the end portions of the outer skin member and is covered with the end portions of the outer skin member. In order to solve the above-mentioned drawbacks, another molding method has been disclosed in JP-63-55954, where a pair of end portions defining the opening is arranged to be fitted with each other due to the foaming pressure of a liquid foamable material in order to prevent the liquid foamable material from being leaked through the opening.

However, in case that a frame is inserted in the outer skin member, it is necessary to enlarge the opening of the outer skin member. Accordingly, even if the method disclosed in JP-63-55954 is applied to such a case, it is difficult to prevent the liquid foamable synthetic resin from being leaked from the outer skin member.

SUMMARY OF THE INVENTION

It is therefore the object of the present invention to provide a method for molding a skin-covered article which solves the problems that a liquid foamable material is leaked from the opening of the outer skin member and the external appearance is degraded by spots of the liquid foamable resin and the improper connection of end portions of an outer skin member, while improving the working efficiency.

A method of molding a skin-covered article, according to the present invention comprises the following steps: (a) putting an outer skin member having an opening to a mold; (b) putting a frame in said outer skin member; (c) setting a pair of wires at the end portion of said outer skin member so that the opening is tightly closed; (d) pouring a liquid foamable material in said outer skin member upon opening the opening; (e) closing the opening and said mold and curing said liquid foamable material; and (f) removing said wires from said outer skin member.

With this arrangement, since the end portions defining the opening is fittingly closed due to the biasing force of the wires, the liquid foamable resin is prevented from being leaked out outside of the outer skin member. Accordingly, various external drawbacks such as an incorrect connection of the outer skin member are prevented from occurring.

BRIEF DESCRIPTION OF THE DRAWINGS

In the drawings, like reference numerals designate like elements and like parts throughout the figures in which:

FIG. 1 is a side view, partly in section, showing a condition in that an outer skin member of a first embodiment is set in a mold, in accordance with the present invention;

FIG. 2 is a side view, partly in section, showing a condition in that the molding of a skin-covered foamed member has been finished in accordance with the present invention;

DETAILED DESCRIPTION OF THE INVENTION

Figure 3:
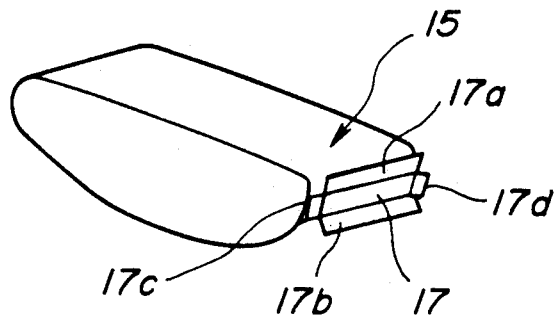
FIG. 3 is a perspective view of the outer skin member which is used for making an armrest by a method in accordance with the present invention.

Referring to FIGS. 1 to 3, there is shown an embodiment of a method of molding a skin-covered foamed article in accordance with the present invention. The method of molding a skin-covered foamed article is applied to an armrest 11 for an automotive vehicle.

The armrest 11 comprises a frame 12 around which pad member 13 is integrally molded. The pad member 13 is covered with an outer skin member 15. The armrest 11 is installed at a side portion or center portion of a seat back (though not shown) through a hinge portion (though not shown) which is formed at one end portion of the frame 12. The outer skin member 15 includes an outer skin 15a which forms an outer surface of the outer skin member 15 and a wadding 15b which is laminated inside of the outer skin 15a. An opening 17 of the outer skin member 15, which is located at a rear end side of the armrest 11, is defined by four end portions 17a, 17b, 17c and 17d of the outer skin member 15 and arranged to be covered with the end portion 17a, 17b, 17c, 17d.

The method of molding the armrest 11 will be discussed hereinafter with reference to FIGS. 1 and 2.

As shown in FIG. 1, the outer skin member 15 is previously formed to have the opening 17. The outer skin member 15 is set in a mold 21 which is in an opening condition. Next, the frame 12 is inserted into the inside portion of the outer skin member 15. A pair of wires 25 and 26 having the elastic property are set to the inner positions of the end portions 17a and 17b, respectively, so as to tightly close the opening 17 due to the elastic force of the wires 25 and 26. Each end portion of the wire 25, 26 is secured at an upper portion of the mold 21 along a parting line P of the mold 21.

With this wire installation, the opening 17 is fittingly closed to be contacted with the end portions 17a and 17b due to the elastic force of the wire 25, 26.

The mold 21 is opened along the parting line P into right and left mold members 22 and 23. The right and left mold members 22 and 23 are further opened to be pivoted around a pivoting point 28 as shown in FIG. 1.

After setting the outer skin member 15 to the mold 21, a liquid foamable synthetic resin is poured into the space between the outer skin member 15 and the frame 12 through the opening 17 upon keeping the open 17 in an opening state. Then, the opening 17 is closed and the mold 21 is fittingly closed. Then, the foaming cure process is started to integrally mold the pad member 13 with the outer skin member 15 and the frame 12. Since the end portions 17a, 17b, 17c and 17d of the outer skin member 15 are impregnated with the liquid foamable synthetic resin during the molding, the armrest 11 is formed in a shape having a predetermined rigidity. Then, the wires 25 and 26 are removed from the mold 21. The armrest 11 formed in the skin-covered foamed article is taken out from the molding 21.

While the frame 12 is inserted into the inside portion of the outer skin member 15 before the wire 25, 26 is inserted into the inner side of the end portions 17a, 17b of the outer skin member 15, it will be understood that the outer skin member 15, into which the frame 12 has previously been inserted, may be set in the mold 21, and then, the wire 25, 26 may be inserted into the inside position of the end portions 17a, 17b of the outer skin member 15.

Figure 4:
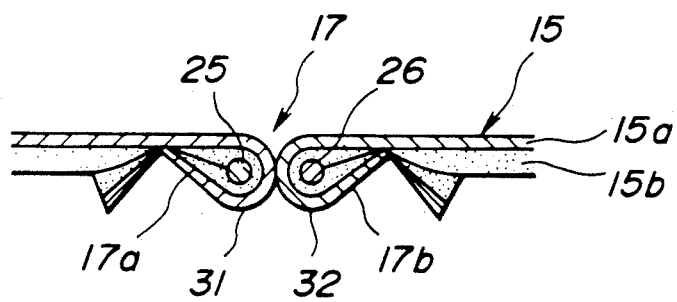
FIG. 4 is an enlarged cross-sectional view of end portions of the outer skin member for a second embodiment in accordance with the present invention.
Figure 5:
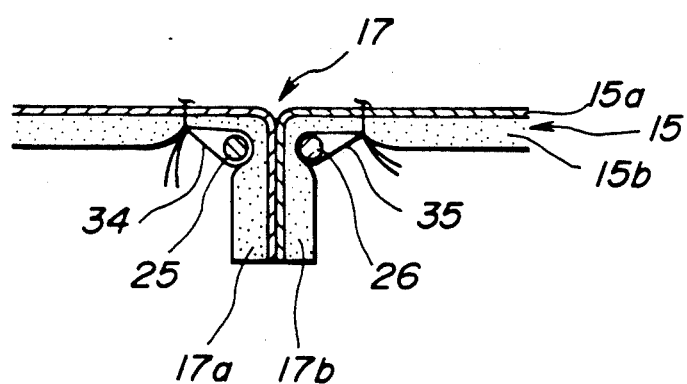
FIG. 5 is an enlarged cross-sectional view of end portions of the outer skin member for a third embodiment in accordance with the present invention.

Referring to FIGS. 4 and 5, second and third embodiments of the method of molding a skin-covered foamed article, which is similar of the first embodiment except for a wire installation portion of the outer skin member.

FIG. 4 shows the second embodiment in which the end portions 17a and 17b are folded inwardly and sewed to form tubular portions 31 and 32. The wires 25 and 26 are arranged to pass through the tubular portions 31 and 32, respectively, so that the end portions 17a and 17b are tightly connected with each other.

FIG. 5 shows the third embodiment in which a previously formed wire installation section 34, 35 is sewed to the end portion 17a, 17b of the outer skin member 15. The wires 25 and 26 are arranged to pass through the wire installation sections 34 and 35, respectively. While the wire installation sections 34 and 35 of the third embodiment have been described as being sewed on to the two end portions 17a and 17b, respectively, it will be understood that only one of the wire installation sections may be sewed to one end portion of the outer skin member.

With the thus arranged methods for molding a skin-covered foamed article, the liquid foamable synthetic resin poured into the outer skin member is prevented from leaking out. This prevents various external drawbacks such as an improper connection of the outer skin member from being caused. Furthermore, since the pair of wires can be repeatedly used for molding articles, the production cost can be lowered.

While the embodiments in the present invention have been for an armrest, it will be understood that the skin-covered foamed article may be used for a headrest, a seat back and the like.

What is claimed is:

1. A method of molding a skin-covered article, comprising by steps:
    (a) putting an outer skin member having an opening to a mold;
    (b) putting a frame in said outer skin member;
    (c) setting a pair of wires at an end portion of said outer skin member, said wires having elastic properties and end portions of said wires being secured to said mold such that said elastic properties act to tightly close the opening;
    (d) pouring a liquid foamable material in said outer skin member upon opening the opening;
    (e) closing the opening and said mold and curing said liquid foamable material; and
    (f) removing said wires from said outer skin member.

2. A method as claimed in claim 1, wherein said mold includes right and left mold members which are opened along a parting line.

3. A method as claimed in claim 1, wherein said outer skin member is formed with an outer skin and a wadding which are laminated to each other.

4. A method as claimed in claim 1, wherein said outer skin member has four end portions which define the opening.

5. A method as claimed in claim 1, wherein said liquid foamable material is a foamable synthetic resin.

6. A method as claimed in claim 2, wherein an upper part of the right and left mold members is pivoted around a point at generally a middle portion of the mold.

7. A method of molding a skin-covered article, comprising the steps of:
    (a) forming an outer skin member to have an opening and sewing end portions of the skin member at the opening of said outer skin member to form tubular portions;
    (b) putting said outer skin member having said opening into a mold;
    (c) inserting a frame in said outer skin member;
    (d) setting a pair of wires at the opening of said outer skin member by passing said wires through the tubular portions of said outer skin member, said wires having elastic properties and end portions of said wires being secured to said mold such that said elastic properties act to tightly close the opening;
    (e) pouring a liquid foamable material in said outer skin member upon opening the opening;
    (f) closing the opening and said mold and curing said liquid foamable material; and
    (g) removing said wires from said outer skin member.

8. A method of molding a skin-covered article, comprising the steps of:
    (a) forming an outer skin member to have an opening and sewing a previously formed wire installation section to end portions of the skin member at the opening of said outer skin member;
    (b) putting said outer skin member having an opening into a mold;
    (c) inserting a frame in said outer skin member;
    (d) setting a pair of wires at the end portions of said outer skin member by passing said wires through the wire installation section, said wires having elastic properties and end portions of said wires being secured to said mold such that said elastic properties act to tightly close the opening;
    (e) pouring a liquid foamable material in said outer skin member upon opening the opening;
    (f) closing the opening and said mold and curing said liquid foamable material; and
    (g) removing said wires from said outer skin member.

* * * * *